US006428028B1

(12) United States Patent
Folino et al.

(10) Patent No.: US 6,428,028 B1
(45) Date of Patent: Aug. 6, 2002

(54) WHEEL TRANSMISSION FOR MOBILITY VEHICLE

(75) Inventors: Frank A. Folino, Salem; James E. Maslow, Lexington, both of MA (US); Michael P. Cunningham, Londonderry, NH (US)

(73) Assignee: Synkinetics, Inc., Lowell, MA (US)

( * ) Notice: Subject to any disclaimer, the term of this patent is extended or adjusted under 35 U.S.C. 154(b) by 0 days.

(21) Appl. No.: 09/455,083

(22) Filed: Dec. 6, 1999

(51) Int. Cl.[7] ................................................ B62M 1/04
(52) U.S. Cl. ........................ 280/249; 475/168; 475/196
(58) Field of Search .......................... 280/242.1, 249, 280/250, 250.1; 475/168, 196

(56) References Cited

U.S. PATENT DOCUMENTS

| | | | |
|---|---|---|---|
| 1,689,285 A | 10/1928 | Knab | |
| 1,735,616 A | 11/1929 | Morrison | |
| 1,738,662 A | 12/1929 | Morrison | |
| 1,946,358 A | 2/1934 | Porsche et al. | |
| 2,416,583 A | 2/1947 | Hartley et al. | |
| 2,787,173 A | 4/1957 | Bergles | |
| 3,227,005 A | 1/1966 | Johnson | |
| 3,477,314 A | 11/1969 | Rutkowski | |
| 3,563,568 A | 2/1971 | Sasse | 280/230 |
| 4,584,904 A | 4/1986 | Distin, Jr. et al. | 74/804 |
| 4,604,916 A | 8/1986 | Distin, Jr. | 74/805 |
| 4,617,837 A | 10/1986 | Kataoka et al. | 74/785 |
| 4,727,965 A | 3/1988 | Zach et al. | 192/6 A |
| 4,762,332 A | 8/1988 | Seol | |
| 4,838,741 A | 6/1989 | Dumoulin | 409/131 |
| 5,312,306 A | 5/1994 | Folino | 475/196 |
| 5,482,305 A | 1/1996 | Jeffries et al. | 280/250.1 |
| 5,486,016 A | 1/1996 | Goden et al. | 280/250.1 |
| 5,514,045 A | 5/1996 | Folino | 476/36 |
| 5,533,424 A | 7/1996 | Mimura | 74/650 |
| 5,577,442 A | 11/1996 | Mimura | 74/650 |
| 5,683,323 A | 11/1997 | Imase | 475/168 |
| 5,743,544 A | 4/1998 | Weaver | 280/249 |
| 5,954,615 A | 9/1999 | Folino | 476/36 |
| 5,989,144 A | 11/1999 | Chen et al. | 475/168 |
| 5,989,145 A | 11/1999 | Bursal et al. | 475/196 |
| 6,039,672 A | 3/2000 | Bursal | 476/36 |
| 6,186,922 B1 | 2/2001 | Bursal et al. | 476/18 |

FOREIGN PATENT DOCUMENTS

| | | | |
|---|---|---|---|
| FR | 2346611 | 10/1977 | 74/650 |
| JP | 59-133863 | 8/1984 | |
| JP | 60-168954 | 9/1985 | |
| JP | 411002309 A | 1/1999 | |
| SU | 1257-331 A | 2/1985 | |
| SU | 1399-548 A | 12/1986 | |
| SU | 1490-362 A | 5/1987 | |
| SU | 1368545 | 1/1988 | |
| SU | 1821597 A1 | 10/1990 | |

OTHER PUBLICATIONS

"Balls Reduce Speed and Transmit Torque", *Mechanical Engineering & Technology Guide*; publ. prior to Mar. 14, 1991.

Dojen™ Precison Rotary Actuator Designer's Guide (Dir. of Lenze, Woburn, MA), published prior to Mar. 14, 1991.

"General Infromation on Sinusoidal Ball Drives", *Soviet Engineering Research*, vol. 6 (1986) Feb., No. 2 @ pp. 23–26, Mowbray, Leicestershire G.B. (also references as *Sov. Engineering Research*, v. Mashinostroeniya, Jun. 1986, Issue 2, pp. 24–28).

*Primary Examiner*—Kevin Hurley
(74) *Attorney, Agent, or Firm*—Perkins, Smith & Cohen, LLP; Jerry Cohen; Jacob N. Erlich

(57) ABSTRACT

A wheel transmission for mobility vehicle includes an input component capable movement at a first rate of motion for selectively driving an output component at either the first rate of motion or a second rate of motion. Operably connected between the input component and the output component is a conversion apparatus which enables the selective drive between the input component and the output component to take place. In addition, the conversion apparatus is capable of preventing the output component from being backdrivable, and thereby acting as a brake, when the vehicle is at rest.

18 Claims, 8 Drawing Sheets

WHEEL TRANSMISSION FOR MOBILITY VEHICLE

BACKGROUND OF THE INVENTION

The present invention relates to mechanical transmissions and more particularly to a multi-function wheel transmission for wheelchairs and the like.

Conventional wheelchairs provide necessary mobility for the disabled. Manually driven chairs have an advantage in that they provide the opportunity for some physical exercise. Nevertheless, manual chairs are limiting to the user because pathways must be relatively flat for easy and safe locomotion. Sloping surfaces are more difficult to roll a chair up than a flat surface and a downward slope can be dangerous if the user loses control of the wheels. Substantial strength and dexterity are required for locomotion on sloping surfaces. A braking mechanism must be included for safety.

Electric wheelchairs give mobility to the disabled for a wide variety of terrain. But electric chairs can be expensive and bulky and deprive the user of physical exercise. Manually driven wheelchairs provide a lesser degree of mobility but are lighter, less expensive and can provide a good opportunity for controlled exercise.

It is therefore an object of the present invention to provide a new multi-speed transmission for use in a mobility enhancing vehicle, such as a wheelchair.

It is another object of the present invention to provide a new braking mechanism in a mobility vehicle.

It is yet another object of the present invention to provide a new multi-function transmission for use in a mobility enhancing vehicle which has a braking mechanism for safety.

SUMMARY OF THE INVENTION

The present invention relates to mechanical transmissions and more particularly to a multi-function wheel transmission for wheelchairs and other mobility enhancing vehicles. In an embodiment of the present invention, a selectable "low gear" is provided for going up a hill. Use of this embodiment in a wheelchair lessens user anxiety by inherently providing a safety mechanism that prevents runaway on a ramped or sloped surface; this innovation provides increased mechanical advantage while also having inherent safety braking. The result is enhanced confidence and mobility both for an average user and for a hard driving athlete in a manual wheelchair.

A preferred embodiment of the invention is built into each wheel and has two modes. The user selects the mode by using a braking lever. When the brake is off the wheelchair operates like a conventional manual chair. The user strokes the drive rim to drive the chair. This is the normal mode.

When the brake is set, then the wheelchair acts as if the brake is on as in the conventional manner. But if the drive rim is stroked then the wheelchair is propelled via the torque-amplifying hub transmission of the invention. The result is that the wheelchair can traverse a steep incline or decline and as soon as the user stops driving the rim, the wheelchair safely comes to a stop. Now threatening hills and steep ramps can be safely traversed at any rate, slow or fast, even with a rest stop in the middle. With the hub transmission engaged, there can be no runaway. This is the speed converter mode.

In use, just like using low gear on a bike, compared to a conventional wheelchair trying to go up a steep incline, the hub makes it much easier on the muscles—and feels it—because of it is a torque amplifier. The chair is used in the convention manner when rolling on level ground. But when easier propulsion or self-braking is important, the user puts the brakes on and then uses the drive rim through the hub for propulsion.

The mechanical advantage in the hub can be so effective as to make it possible for a user to propel up an incline that heretofore was considered insurmountable. Or this mechanical advantage may benefit an aged or enfeebled user even on a level surface. In any event, the hub invention can extend the range of mobility of the conventional manual wheelchair and its user. The present invention results in increased mobility in an easy to use and cost-effective wheel design for any wheelchair, new or retrofit.

Since athletic events for the wheelchair-bound are becoming more popular, there is a variation on the above theme that is part of the invention. Rather than a speed reducer hub, we implement a speed increaser hub for a racing wheelchair, where the user can select a high-speed overdrive mode to increase the top-end speed achievable by the racer. In this case the speed increaser is used for much like a high gear in an automobile. The shift mechanism for the wheels can be tied together to be activated simultaneously and on-the-fly. There is no auto-braking feature in this embodiment.

In a preferred embodiment of the invention, each wheel has a single drive rim that performs two functions. A brake assembly is provided to manually shift between two modes: a 1:1 conventional drive mode and a n:1 non-backdrivable self-braking mode. In the latter mode, rotary motion applied to the rim is translated via a hub assembly to drive the wheel via a non-backdrivable torque amplifying speed reducer. In this aspect of the invention, the wheel brake is automatically applied to the wheel to stop unwanted motion, unless the drive rim is rotated. In another aspect of the invention, when the brake is disengaged, per wheel, rotation of the drive rim drives the wheel in a conventional manner.

In a preferred embodiment of the present invention rotary motion applied to the drive rim is translated via a conjugate pair of devices rotatable about a common axis, and a ball or roller type translating arrangement, interposed between the conjugate pair about the common axis, including a slotted retainer device, forming a torque amplifying non-backdrivable speed reducer, to drive the wheel. When the drive rim is not being rotated and the brake is engaged, then the wheel is automatically prevented from rolling to stop unwanted motion unless the drive rim is intentionally driven. When the brake is disengaged, rotation of the drive rim drives the wheel in a conventional manner.

It will now be appreciated that a multi-motion transmission is disclosed, having an input, reaction system, housing, and output. In an embodiment of the invention, a first of these items connects to a second one to form a first mode of operation, and the first of the items decouples from the second one and couples to a third item to form a second mode of operation. Speed conversion apparatus is provided and the input is rotatably coupled to the output via the speed conversion apparatus in one mode of operation, wherein the input has a first rate of motion and the output has a second rate of motion.

Clutching provides for selectively switching between the first mode and second mode, and selectively engages one of the said items to other ones of said items, for provision of the first rate of motion in one mode and a second rate of motion in the other said mode. In a preferred embodiment, this clutching action enables a braking function in one mode, where the hub transmission includes a non-backdrivable speed reducer. In another embodiment, the speed conversion apparatus is a backdrivable speed increaser.

Preferably the transmission of the invention includes a conjugate pair of devices nested concentrically about a common axis, where a first of the pair of the devices is an inner cam gear and the second is an outer cam gear. The cam gears may include rotary wavy tracks. A slotted part is nested between the two can gears and has a plurality of slots for receipt of interacting elements (balls or rollers). Where the transmission has a housing, such as a wheelchair frame, the input and output are selectively rotatable relative to the housing, wherein a shifting part engages one of the devices for switching between a first mode and a second mode of operation, such as for switching between 1:1 and n:1 operation.

BRIEF DESCRIPTION OF THE DRAWINGS

These and other features and advantages of the present invention will be more fully understood by reference to the following detailed description in conjunction with the attached drawing in which like reference numerals refer to like elements and in which.

DETAILED DESCRIPTION OF THE PREFERRED EMBODIMENT

Figure 1B:
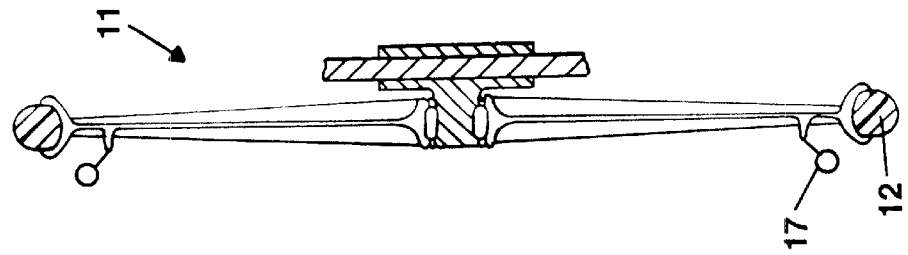
FIGS. 1A and 1B show prior art wheelchair and wheel design, respectively.
Figure 1A:
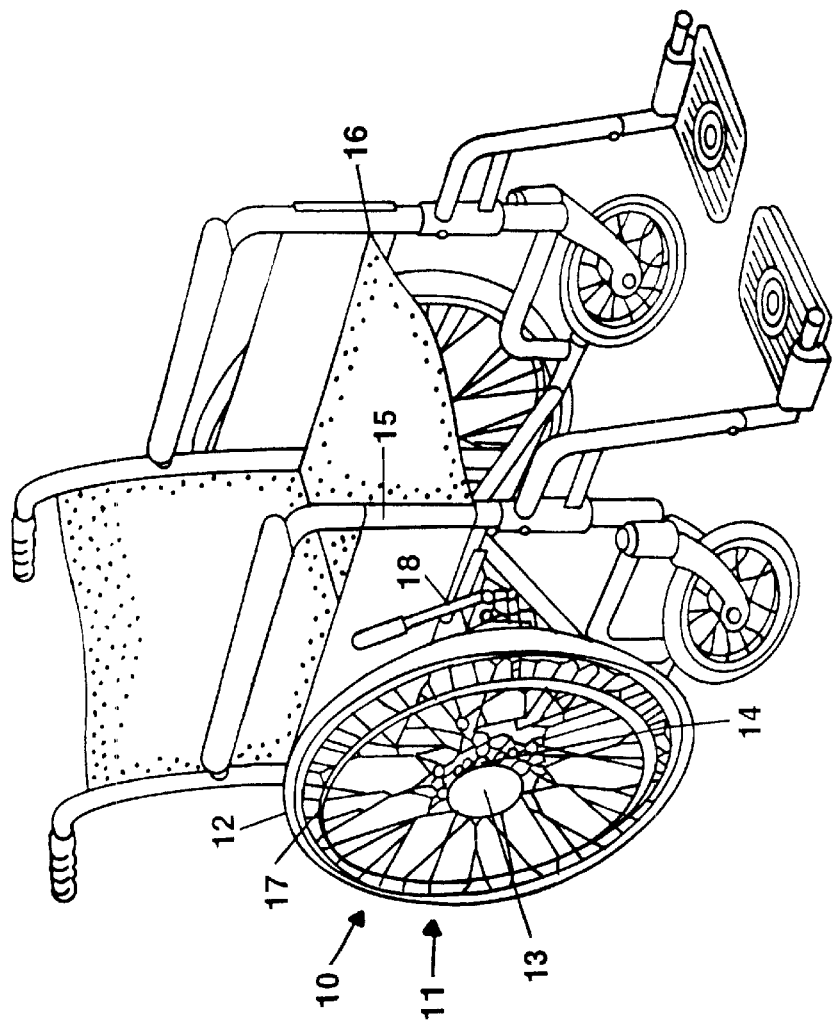
Figure 2:
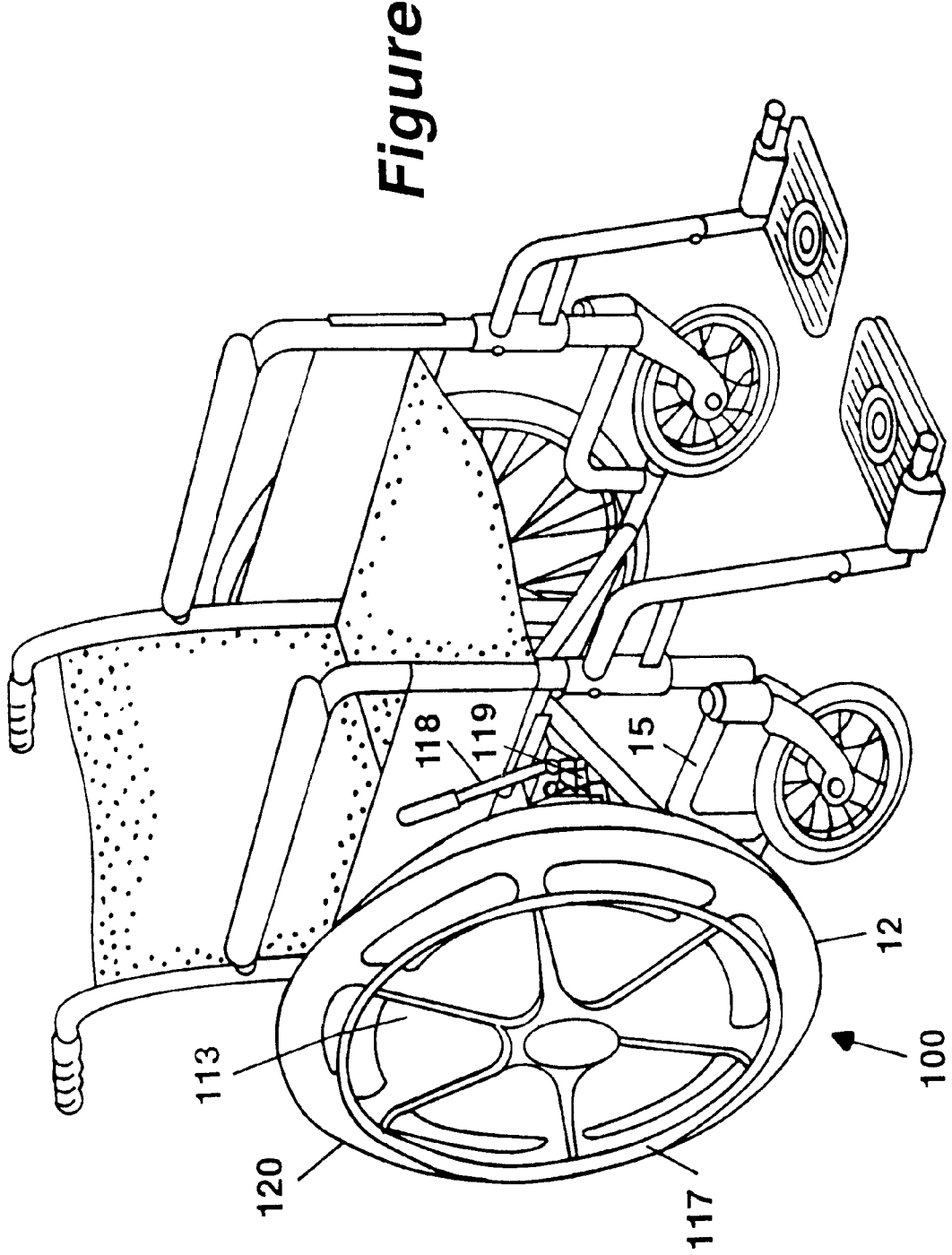
FIG. 2 is a perspective view of a preferred wheelchair embodiment of the present invention.
Figure 3:
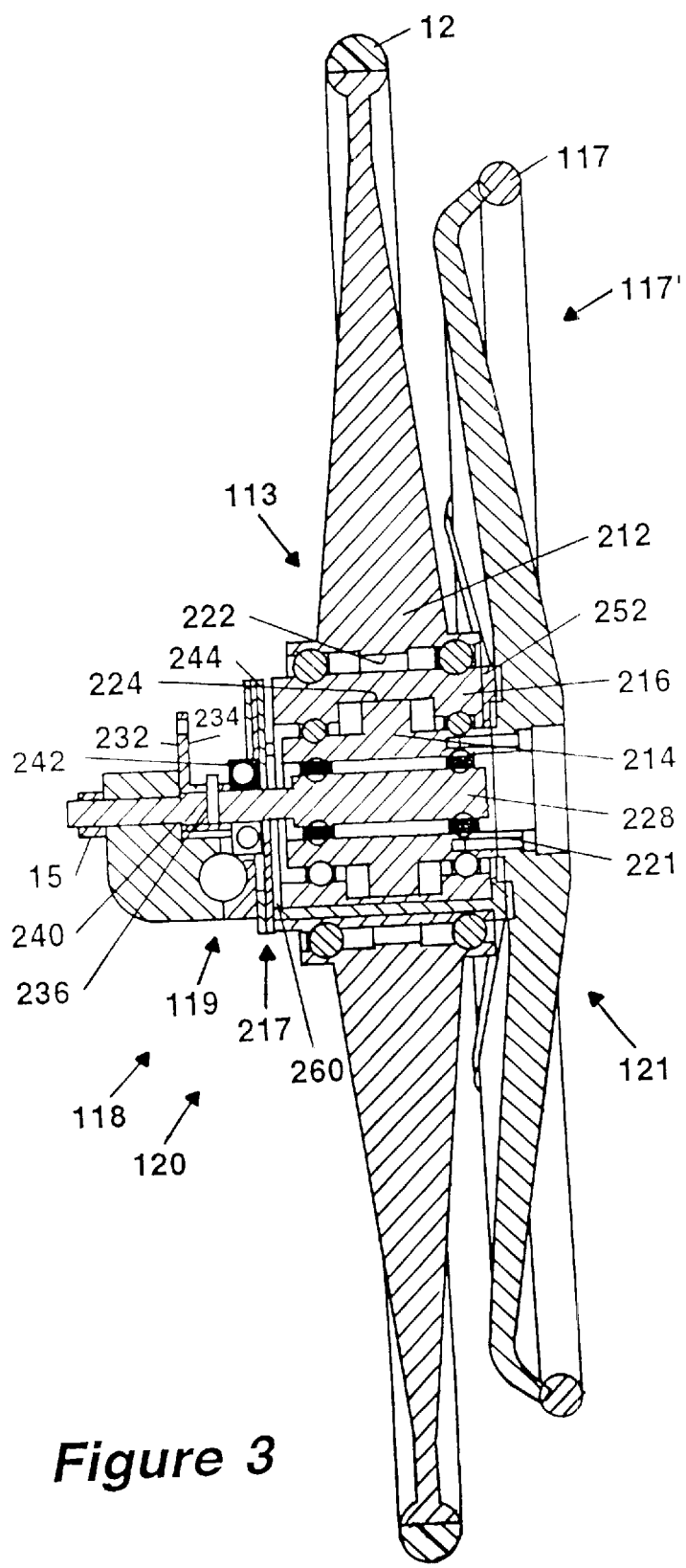
FIG. 3 is a side cross-section of a wheel assembly embodiment of the invention.

FIGS. 1A and 1B show a conventional wheelchair 10 and a conventional wheel assembly 11. This assembly has wheel 12 on hub 13, spinning on shaft 14 mounted to the chair frame 15 under seat 16. Attached to wheel 12 is a drive rim 17. Hand brake 18 prevents the chair from rolling unintentionally. Hand rotation of rim 17 rotates wheel 12 to manually propel the wheelchair when the brake is not set.

When it is desired to manually propel this wheelchair up or down a long or steep incline, the task becomes more difficult. This is because the chair wants to roll down the incline of its own accord and the user is put at risk if he releases his hand from the drive rim to rest or even to put on the hand brake. Going up or down a slope must be able to be achieved safely at a controlled rate.

The present invention overcomes these difficulties by being switchable between two modes, one is the conventional free-wheeling mode and the other is a new self-braking mode. In the free-wheeling mode, the rim and wheel operates conventionally as if the brake is off. In the self-braking mode, the wheel operates as if it has a brake set on it, but the rim is still rotatable to achieve wheelchair motion on demand.

As shown in FIGS. 2–11, wheel assembly embodiment 100 of the present invention has the conventional rubber wheel 12 on a special hub 113, and a mode switching mechanism 118 that includes a braking assembly 119. Also provided is a drive rim 117 that drives a hub transmission assembly 120. The hub transmission assembly 120 includes a speed converter 121, taking the form of a speed reducer 121' (FIG. 4) or speed increaser 121" (FIG. 11) according to desired effect as described below.

In a preferred embodiment of the invention, the speed converter 121 is a n:1 speed reducer 121' and is engaged when brake assembly 119 is set to the self-holding mode. When the brake is thus engaged, rim 117 is used to propel the wheelchair with the torque amplifying benefit of n:1 speed reduction. In a preferred embodiment, the ratio is 4:1 and has a self-holding (i.e., non-backdrivable) output on which the wheel 12 is mounted. When the brake is set, wheel 12 is driven via this self-holding output when rim 117 is rotated. But when the brake is set and the rim is still, the wheelchair stays still even on a sloping surface. This is the self-braking mode.

When the brake assembly 119 is released, speed converter 121 is locked up assembly and can be freely rotated via rim 117 in the conventional 1:1 manner to drive wheel 12. This is the conventional free-wheeling mode.

It will thus be appreciated that this arrangement solves the conventional wheelchair mobility problems by providing a 1:1 drive for usual wheelchair use via conventional use of the drive rim 117 with the "brake" off. But with the "brake" engaged, the self-holding hub transmission 120 is driven by rotation of rim 117 to provides n:1 extra mechanical advantage that enables traverse of sloped surfaces. The extra mechanical advantage and the safety of self-holding provides a level of mobility and safety to the manually driven wheelchair of the invention. When the rim is still, the wheel is still and held in place as if a conventional brake were holding it thus.

Figure 4:
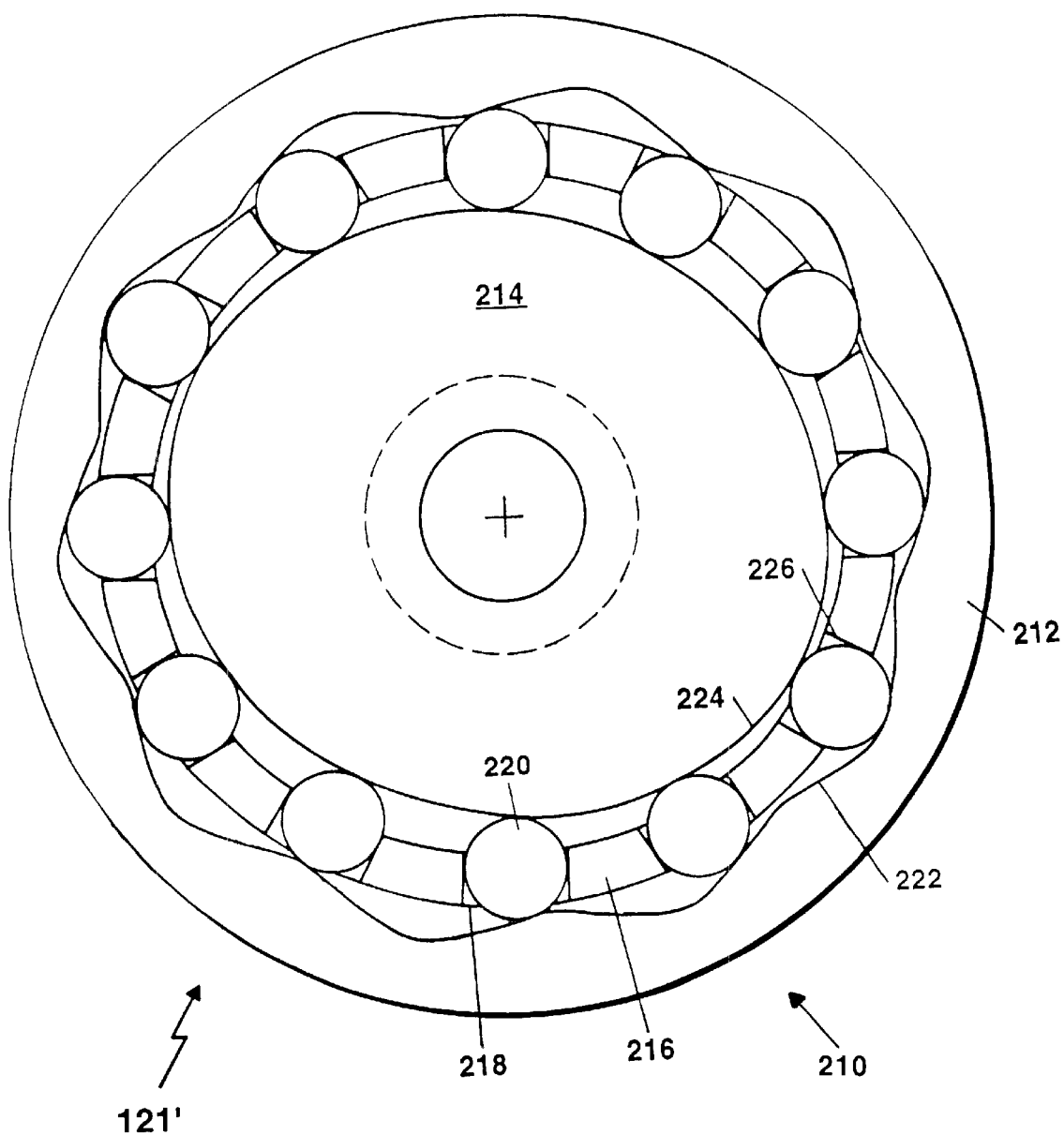
FIG. 4 is a plan view of a preferred nested speed reducer in practice of the invention of FIG. 3.

A preferred practice of hub transmission 120 uses a cam gear and roller/ball type speed converter. As shown in FIGS. 4, a preferred speed reducer 121' of the present invention includes outer cam gear 212, inner cam gear 214, slotted intermediate member 216, the latter having slots 218 for receipt of rolling elements (balls or rollers) 220. Outer gear 212 has projections which define teeth or tooth flanks 222. Inner gear 214 has projections which define tooth flanks 224. Slots 218 have defined flanks 226.

Figure 6:
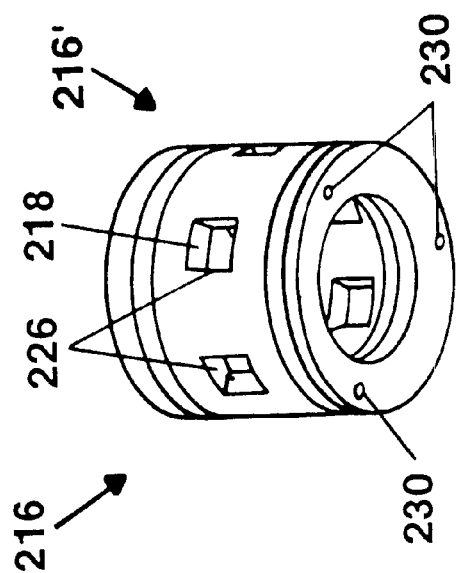
FIG. 6 is a perspective view of the slotted member of an embodiment of the invention.
Figure 5:
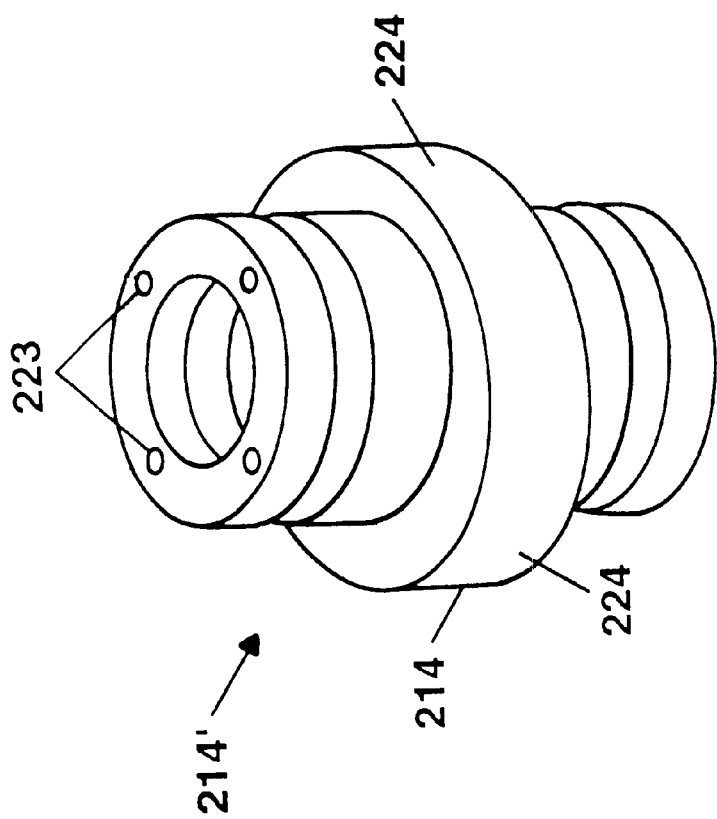
FIG. 5 is a perspective view of the inner cam gear assembly of an embodiment of the invention.
Figure 8:
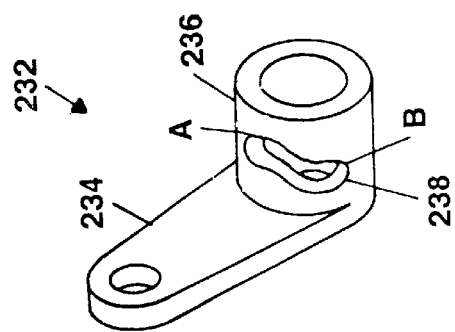
FIG. 8 is a perspective view of a shifting lever of an embodiment of the invention.
Figure 7:
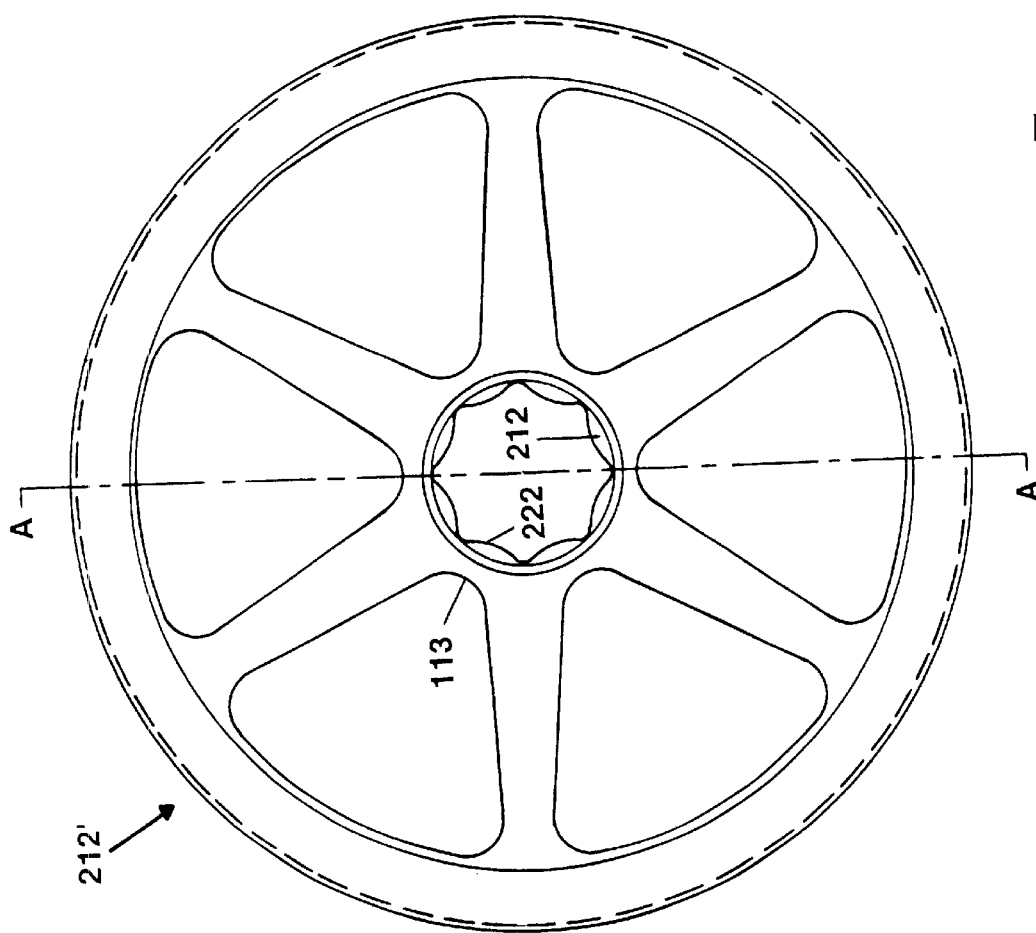
FIG. 7 is a plan view of the outer cam gear and wheel assembly of an embodiment of the invention.
Figure 10:
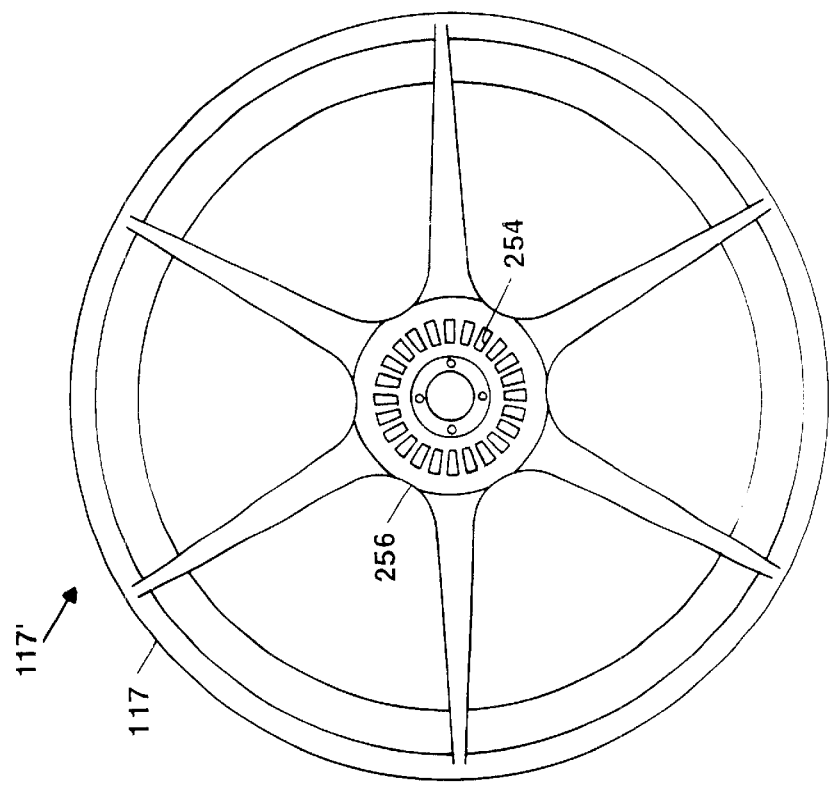
FIG. 10 is a plan view of a rim assembly of an embodiment of the invention.
Figure 9:
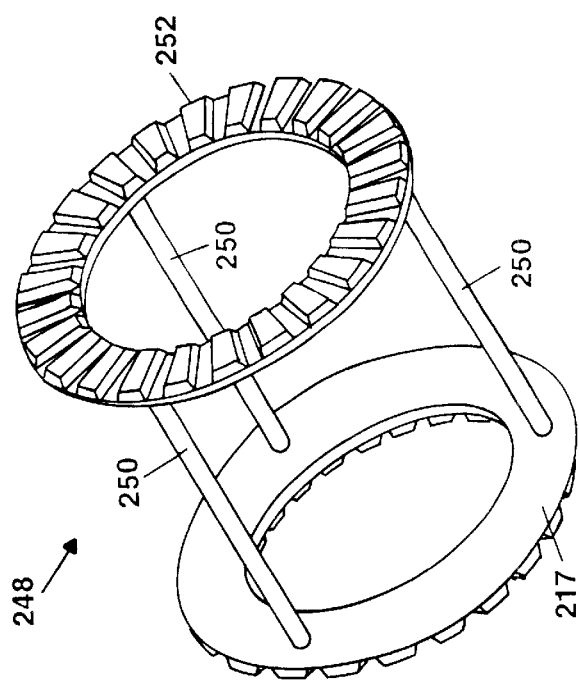
FIG. 9 is a perspective view of a mode switching shuttle assembly of an embodiment of the invention.

As shown in FIG. 5, the cylindrical inner cam gear part 214' includes cam gear 214, and tooth projections or flanks 224. As shown in FIG. 6, the intermediate cylindrical slotted assembly 216' includes the slotted part 216, slots 218 and pin guides or receivers 230. As shown in FIG. 7, the cylindrical outer cam gear part 212' includes hub 113 which defines cam gear 212 with tooth projections or flanks 222. The rim assembly 117' is affixed to inner cam gear 214 via bolts 221 in tapped holes 223 of the inner cam gear.

Brake assembly 119 is mounted on the chair frame 15 and engages a braking plate 217 that is coupled to speed converting hub transmission 120. The hub 120 is rotatably mounted on axle 228, and axle 228 is fixed to the wheelchair frame 15. When the brake assembly is set to the free-wheeling mode, rotation of rim 117 drives the entire hub assembly as one internally locked part to drive the wheel into rotation without any additional speed ratio other than from use of the conventional rim, hence referred to as 1:1. The brake assembly is described in detail below.

In a preferred embodiment, when the brake assembly 119 is engaged then the intermediate part 216 is non-rotatably coupled via brake assembly 119 and the brake plate 217 to the chair frame 15. Now rotation of rim 117, mounted to inner cam gear 214, rotates the inner cam gear 214 as a drive input. This rotation drives rollers 220 against the flanks of outer cam gear 212 while reacting on the flanks 226 of the slots 218 of the fixed intermediate part 216. This action drives outer cam gear 212—and thus the wheel 12—into rotation. The speed reduction ratio of speed converter 121 is determined by comparing the greater number of teeth of the driven gear to the lesser number of teeth of the drive gear. In the example of FIG. 4, the outer cam gear defines eight teeth and the inner defines two teeth. The slotted member has 6 slots, with a rolling element in each slot. The speed reduction ratio is 8:2 or 4:1.

A speed reducer is a torque amplifier. By providing torque amplification to the wheel chair it is possible to manually drive the chair up a steep incline without too much effort. The non-backdrivability feature of the invention assures that there is no loss of control on a sloping surface.

In practice of an embodiment of the invention, rim 117 and inner cam gear 214 to which it is affixed are able to be rotated clockwise or counter clockwise when the brake is set, as would seem conventional, and then the output (i.e., wheel 12 mounted on outer cam gear 212) rotates accordingly at an n:1 torque-amplified reduced speed. If the speed reducer output is non-backdrivable, then the output of the speed reducer cannot be rotated as if it were an input to backdrive into the hub transmission. Thus the non-backdrivable speed converter assembly 121 will not let the wheels roll randomly, thus acting as a brake if it is engaged in the self-holding mode. With the brake set, if a user is propelling himself up or down a slope, then when he stops spinning the rim and even lets go of rim 117, the chair will come to rest as the rim spins to rest and will stay at rest until the user again rotates the rim. Pushing on the chair will not move the chair. The chair will not roll randomly. This is the self-braking mode.

This selectable self-braking mode is an important safety feature for riding of sloping terrain and permits a handicapped rider to increase his range of exploration to beyond conventional flat places. In using the speed reducer as a brake, the user can spin the rim down slowly for gradual stopping or abruptly for sudden stopping, as desired. When on flat terrain the user can select the free-wheeling mode.

The user can release the brake and switch into 1:1 mode, freeing up the speed reducer 121' so that it can freely rotate, and then he can use the chair in the conventional manner, even allowing it to roll down a slope at will. This 1:1 mode is the standard wheeling mode, where the rim and wheel will rotate as in a conventional wheelchair. When the speed reducer 121' is freed up in this manner, it also simultaneously becomes intentionally locked up, so that drive rotation of rim 117 will be transmitted faithfully to wheel 12.

In either mode, anytime the user wants to move he can rotate rim 117. An additional conventional brake can be added for special cases.

It has been discovered that the non-backdrivable character describes a static condition of this nested speed reducer of FIG. 4, such that when the input cam gear 214 is at rest, the output 212 is not backdrivable into the device. The output cannot be used as an input to drive the input cam gear 214 into rotation. This non-backdriveability appears to be an artifact of the "stiction" between the at-rest interacting elements and the contacted flanks of the slots and cam gears, where there is a high resistance to initiation of rolling of the interacting elements upon input rotation of the multi-toothed outer gear 212 even if the wheelchair were pushed or if it were on a steep slope. This self-holding is a static condition. The invention permits a limited degree of backdriving (coasting) when the wheels are rolling, but essentially the wheels will spin down as the rim spins down.

This static high resistance to rolling is a function of pressure angle design of the cam gear tooth flank profiles. As with gears, the pressure angle is defined as the angle between the tangent surface at the contact point and a radius drawn between the contact point and the axis of rotation. Using this angle, the contact force may be decomposed into a tangential force (which contributes to torque transmission and scales with the cosine of the pressure angle) and a radial force (which does not contribute to torque transmission and scales with the sine of the pressure angle). The concept of pressure angles for gears is well known and will be appreciated by a person skilled in the art of speed converters to apply to the teeth of the disclosed cam gears.

The cam gear teeth of converter 121 as a speed reducer are configured with a pressure angle so shallow that backdriving from at rest cannot occur from the output. The pressure angle (PA) is defined, as with gears, as the angle between the tangent surface (t) at the contact point and a radius (r) drawn between the contact point and the axis of rotation. The following definitions are made, where the input rotation is applied to the low-tooth count cam:

| Term or symbol | Meaning |
| --- | --- |
| $\mu$ | Coefficient of (static) friction between ball and low cam |
| N | Number of teeth on low cam |
| $\Delta R$ | Rolling element stroke in slot |
| $R_{avg}$ | Average (mid-stroke) distance of rolling element center from axis of rotation of drive |
| $\alpha$ | Half-lobe angle of low cam, given by $\alpha = \pi/N$ radians |
| PA | The pressure angle is 90°-$\alpha$. |
| $\nu$ | Crossing angle over rolling element of track on low cam, given by $\nu = \tan^{-1}(\Delta R/R_{avg}\alpha)$ |

In light of these definitions, the non-backdriveability condition in the conventional sense for speed conversion mechanisms of the above kind can be expressed in the following relationship (and as the definition of "shallow"):

$$\mu > \tan\nu.$$

When this condition holds, the output 212 cannot backdrive into the low tooth-count cam gear input 214; otherwise, the drive is backdrivable (whether it is a speed reducer or speed increaser).

Therefore speed converter 121 as a non-backdrivable speed reducer 121' along with mode switching assembly 118 defines a braking mechanism 119 of the invention. The cam gears 212 and 214 are configured with pressure angles that are so shallow that backdriving from at rest cannot occur from the output 212 toward the input 214. Thus the wheelchair at rest remains at rest when the speed reducer 121' is engaged via the brake assembly 119.

Referring to FIGS. 2–10, the brake assembly 119 includes a mode shifting device 232 having a handle 234 and a barrel 236 mounted on shaft 228. Barrel 236 defines a cam slot 238 and a pin 240 mounted in shaft 228 rides in the cam slot 238. Bearing 242 is slideably mounted on shaft 228. Plate 244 is fixed to the chair frame 15. Bearing 242 slides through plate 244 and up against plate 217 of shuttle assembly 248. Plate 217 is affixed to the ends of pins 250 which are slideably mounted in pin receivers 230 of slotted part 216. The pins 250 also mount to the base of a braking plate 252 of shuttle assembly 248.

The mode shifting device 232 is shifted between the two mode positions, A and B. When handle 234 is rotated, say clockwise, the mode shifting device 232 is shifted into the "normal" position, with pin 240 located at position A of cam track 238. The resulting travel of barrel 236 along axle 228 forces bearing 242 inward against plate 217 of shuttle assembly 248, which in turn drives shuttle assembly 248 until its plate 252 drives up against a braking surface 254 on the hub 256 of rim assembly 117'. Rim assembly 117' remains bolted to the inner cam gear 214, but this action also locks the intermediate slotted part 216 to the inner cam gear 214 via the rim assembly 117' connection. This action locks up the speed converter 121 while also freeing the entire speed converter to be rotatable on axle 228. Plate 217 of shuttle assembly 248 is pulled away from plate 244 and is rotatable along with speed converter 121. The speed converter is thus locked up but is rotatable on axle 228. The speed converter rotates as a solid assembly carrying rotation of the rim 117 to the wheel 12 without speed conversion, as in a convention manner. This is the normal or free-wheeling mode of operation.

It will now be understood that when the shuttle is moved to its second position using the mode shifting mechanism 232, the shuttle disengages any fixed connection between the speed reducer 121' and frame 15 and locks up the speed reducer internally by locking the slotted part 216 and outer cam gear 212 together to prevent relative movement between the parts 212, 214 and 216. This also frees up the speed converter assembly 121 to rotate on axle 228. The speed converter assembly being thus free to rotate and yet also internally locked up, delivers the drive motion on the drive rim to the wheel without any additional speed reduction. The result is that rim 117 operates as if it were conventional, driving the wheel in a conventional manner as though the brake were disengaged.

When handle 234 is rotated counter-clockwise, the mode shifting device 232 shifts to the "self-braking" position, with pin 240 now located at position B of cam track 238. Spring 260 drives plate 217 against fixed plate 244. Acting like a disk brake, now plate 217 and plate 244 are non-rotatably held together and fixed to the frame. Braking plate 252 of the shuttle assembly 248 is pulled away from the braking surface 254 of rim assembly 117'. The rim assembly 117' remains affixed to inner cam gear 214.

With plate 217 and plate 244 non-rotatably held together and locked to the frame, the shuttle assembly 248 and intermediate part 216 are now non-rotatable. With braking plate 252 now pulled away from the braking surface 254 of rim assembly 117', speed converter 121 is ready to operate. Rotating rim 117 now rotates the inner cam gear 214 as a drive input. This rotation drives rollers 220 against the flanks of outer cam gear 212 while reacting on the flanks 226 of the slots 218 of the fixed intermediate part 216. This action drives outer cam gear 212, and thus the wheel 12, into rotation according to the speed ratio of speed converter 121.

It will now be appreciated that the shuttle assembly 248 is shifted between two positions by the mode shifting mechanism 232. In one position the shuttle engages the chair frame 15 to lock down the slotted part 216 to the frame. Now rotation of drive rim 117 rotates inner cam gear 214, which drives outer cam gear 212 into rotation according to the speed ratio of speed converter. The chair is propelled accordingly. With speed converter 121 designed as a non-backdrivable speed reducing mechanism, when the rim is at rest then the chair is at rest, and the speed converter performs the braking function automatically. Without further shifting of the mode shifting mechanism, any rotation of the rim propels the chair as long as the rim keeps spinning. With the rim at rest the chair stays at rest.

If speed converter 121 is a non-backdrivable speed reducer then it acts as a brake when engaged. As soon as the shuttle is shifted out of conventional mode and into the self-braking mode, the speed reducer 121' is again engaged and acts as the brake to hold the wheel still until rim 117 is again intentionally rotated.

It will now be appreciated that in an autobraking embodiment of the invention, when the brake is off then the wheelchair operates entirely as a conventional manual chair. The user strokes the wheel rim to drive the chair. When the brake is set, then the wheelchair acts as if the brake is set similar to in a conventional chair. The wheelchair is kept in place. But if the driving rim is stroked then the wheelchair is propelled via the torque-amplifying hub transmission of the invention. The result is that the wheelchair can traverse a steep incline or decline and as soon as the user stops driving the rim, the wheelchair safely comes to a stop. Now threatening hills and steep ramps can be safely traversed at any rate, slow or fast, even with a rest stop in the middle. With the hub transmission of the invention thus engaged, there can be no runaway.

Where the invention has a speed reducer in the hub, driving through it is just like using low gear on a bike. Compared to a conventional wheelchair trying to go up a steep incline, the hub makes it much easier on the muscles—and feels it—because the speed reduction and torque amplification. The strong user would use conventional propulsion when rolling on level ground. But when easier propulsion or self-braking is important, the user puts the brakes on and then uses the drive rim of the hub for propulsion The automatic safety and security of the self-braking feature also gives a greater level of confidence to the user. As well, the mechanical advantage in the hub can be so effective as to make it possible for a user to propel up an incline that heretofore was considered insurmountable. Or this mechanical advantage may benefit an aged or enfeebled user even on a level surface. In any event, the hub invention can extend the range of mobility of the conventional manual wheelchair and its user. The present invention results in increased mobility in an easy to use and cost-effective wheel design for any wheelchair, new or retrofit.

Since athletic events for the wheelchair-bound are becoming more popular, there is a variation on the above theme that is part of the invention. Rather than a speed reducer hub, we implement a speed increaser hub for a racing wheelchair, where the user can select a high-speed overdrive mode to increase the top-end speed achievable by the racer. In this case the speed increaser is used for much like a high gear in an automobile. One shift mechanism can be used to shift both wheels simultaneously on-the-fly. There is no autobraking feature in this embodiment. A separate brake assembly is required for braking.

Figure 11:
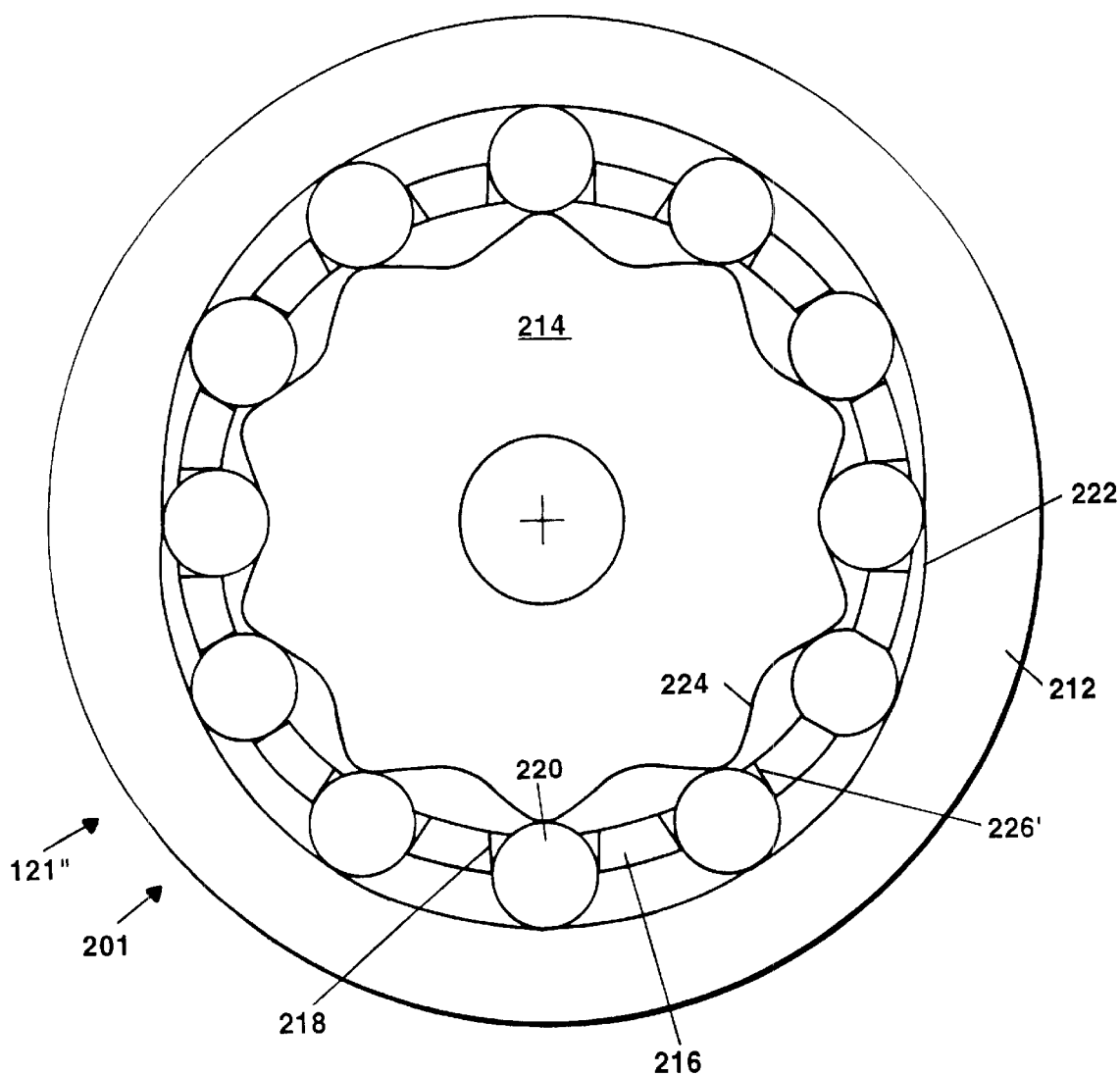
FIG. 11 is a plan view of a nested speed increaser in practice of an embodiment of the invention.

FIG. 11 shows a speed increaser 121" of the nested cam gear type. This is applied to the configuration of FIG. 3. If the speed converter 121 is a back-drivable speed increaser, then the second mode is a speed-up overdrive mode for the athletic racer, without the automatic braking function. In position A of the shifter, the drive is 1:1, and in position B, the drive is 1:n speed increaser. There are ten teeth on the inner cam gear 214 and five teeth on the outer cam gear 212, such that at 5:10 or 1:2 speed increase is achieved in this example. The drive is backdriveable and does not perform a braking function.

The foregoing embodiments are examples of the invention and are disclosed by way of illustration not limitation. Various modifications of the specific embodiments set forth above are within the spirit and scope of the invention. The scope of these and other embodiments is limited only as set forth in the following claims.

What is claimed is:

1. A wheelchair capable of being driven at different rates, comprising a transmission having
      an inner cam gear device,
      an intermediate device with slots,
      an outer cam gear device,
   a first of said devices connecting to a second of said devices to form a first mode of operation, and said first of said devices decoupling from said second of said devices and coupling to a third of said devices to form a second mode of operation,
   one of said devices comprising a rotary input device and another of said devices comprising a rotary output device,
   a conversion mechanism, and
   said input device rotatably coupled to said output device via said conversion apparatus in one said mode of operation, wherein said input device has a first rate of motion and said output device has a second rate of motion.

2. The wheelchair of claim 1 wherein said output device drives a wheel attached to the frame of the wheelchair, wherein said conversion mechanism further comprises a shuttle clutch for selectively switching between said first mode and said second mode, said shuttle clutch selectively engaging one of said devices to another ones of said devices, for provision of said first rate of motion in one of said modes, and for engaging one of said devices said frame for provision of said second rate of motion in the other of said modes.

3. The wheelchair of claim 1 wherein said motion is rotary and said conversion apparatus is a speed reducer.

4. The wheelchair of claim 3 wherein said speed reducer is non-backdriveable.

5. The wheelchair of claim 1 wherein said motion is rotary and said conversion apparatus is a speed increaser.

6. The wheelchair of claim 1 wherein said input device comprises a rotary wavy track.

7. The wheelchair of claim 1 wherein said output device comprises a wavy track.

8. The wheelchair of claim 1 wherein said intermediate device comprises a slotted disk and has a plurality of slots and interacting elements, ones of said elements being in ones of said slots.

9. The wheelchair of claim 1 wherein said input device and output device comprise a conjugate pair of devices concentrically rotatable about a common axis.

10. The wheelchair of claim 9 wherein a first of the pair of devices comprises an inner cam gear and a second of the pair of devices comprises an outer cam gear in a nested relationship.

11. The wheelchair of claim 10 wherein said intermediate device is nested between said cam gear devices.

12. The wheelchair of claim 10 wherein one said device comprises a plurality of rotationally fixed radially extending slots.

13. The wheelchair of claim 1 wherein said input device comprises a rim of a first diameter.

14. The wheelchair of claim 13 wherein said output device comprises a wheel having a diameter larger than said first diameter.

15. The wheelchair of claim 14 further comprising a housing for said intermediate device, said input device and output device being selectively rotatable relative to said housing, wherein said clutch device comprises a shiftable shuttle engaging said intermediate device to a frame of the wheelchair in one said mode and to said outer cam gear in another said mode.

16. The wheelchair of claim 15 wherein in said second mode said input and output rotate, and said input rotates at a speed that is faster than said output speed.

17. A wheelchair having a multi-speed transmission, comprising a wheelchair frame,
   a pair of wheels,
   a housing device,
   a hub assembly operably interconnected to at least one of said wheels, said hub assembly made up of nested devices, including an input device, a reaction device, and an output device,
   a first of said devices connecting to a second of said devices to form a first mode of operation, and said first of said devices decoupling from said second of said devices and coupling to a third of said devices to form a second mode of operation,
   speed conversion apparatus,
   said input device coupled to said output device via said speed conversion apparatus in one said mode of operation,
   a clutch device in said hub assembly for selectively switching between said first mode and said second mode, said clutch device selectively engaging said first of said devices to other ones of said devices, for provision of a first speed in one said mode and a second speed in the other said mode,
   said devices cooperating to drive said wheel hub selectively in said first and second modes.

18. The wheelchair of claim 17 further comprising non-backdrivable speed conversion apparatus, said input device non-rotatably coupled to said output device via said speed conversion apparatus in one said mode of operation and non-backdrivably coupled in a second said mode of operation.

* * * * *